United States Patent

Wiese et al.

[11] Patent Number: 4,966,265
[45] Date of Patent: Oct. 30, 1990

[54] CLUTCH

[75] Inventors: Helmut Wiese, Neunkirchen-Seelscheid; Paul-Erich Schönenbrücher, Much-Kranüchel, both of Fed. Rep. of Germany

[73] Assignee: Viscodrive GmbH, Lohmar, Fed. Rep. of Germany

[21] Appl. No.: 399,866

[22] Filed: Aug. 29, 1989

[30] Foreign Application Priority Data

Sep. 6, 1988 [DE] Fed. Rep. of Germany ....... 3830200

[51] Int. Cl.⁵ .............................. F16D 41/00
[52] U.S. Cl. ...................... 192/35; 192/45; 192/48.2; 192/48.8; 192/58 B; 192/72; 192/84 PM; 180/248
[58] Field of Search ............. 192/35, 44, 45, 48.2, 192/48.3, 48.7, 48.8, 52, 58 B, 72, 84 PM; 180/248

[56] References Cited

U.S. PATENT DOCUMENTS

| 2,403,378 | 7/1946 | Kupela | 192/48.8 |
| 4,305,491 | 12/1981 | Rohrer | 192/58 B |
| 4,796,738 | 1/1989 | East | 192/45 |
| 4,842,111 | 6/1989 | Lanzer et al. | 192/35 |
| 4,848,506 | 7/1989 | Shimada et al. | 192/58 B |

FOREIGN PATENT DOCUMENTS 603418  8/1960  Canada .................................. 192/35

Primary Examiner—Leslie A. Braun
Assistant Examiner—Andrea Pitts
Attorney, Agent, or Firm—Toren, McGeady & Associates

[57] ABSTRACT

A clutch (1) including an inner part (3) and an outer part (4) having races (6 and 5) respectively between which are arranged rollers (4). The rollers are arranged in a cage (7) which is in two parts (8 and 9) which are connected by leaf springs (10). One part (8) of the cage may be operated upon by a brake (11) to retard it relative to the other part of the cage thus to cause the rollers to skew and jam between the races and thus transmit torque between the inner and outer member. The clutch may be associated with a viscous shear coupling (18) and the combination may be used in the driveline of a motor vehicle.

19 Claims, 3 Drawing Sheets

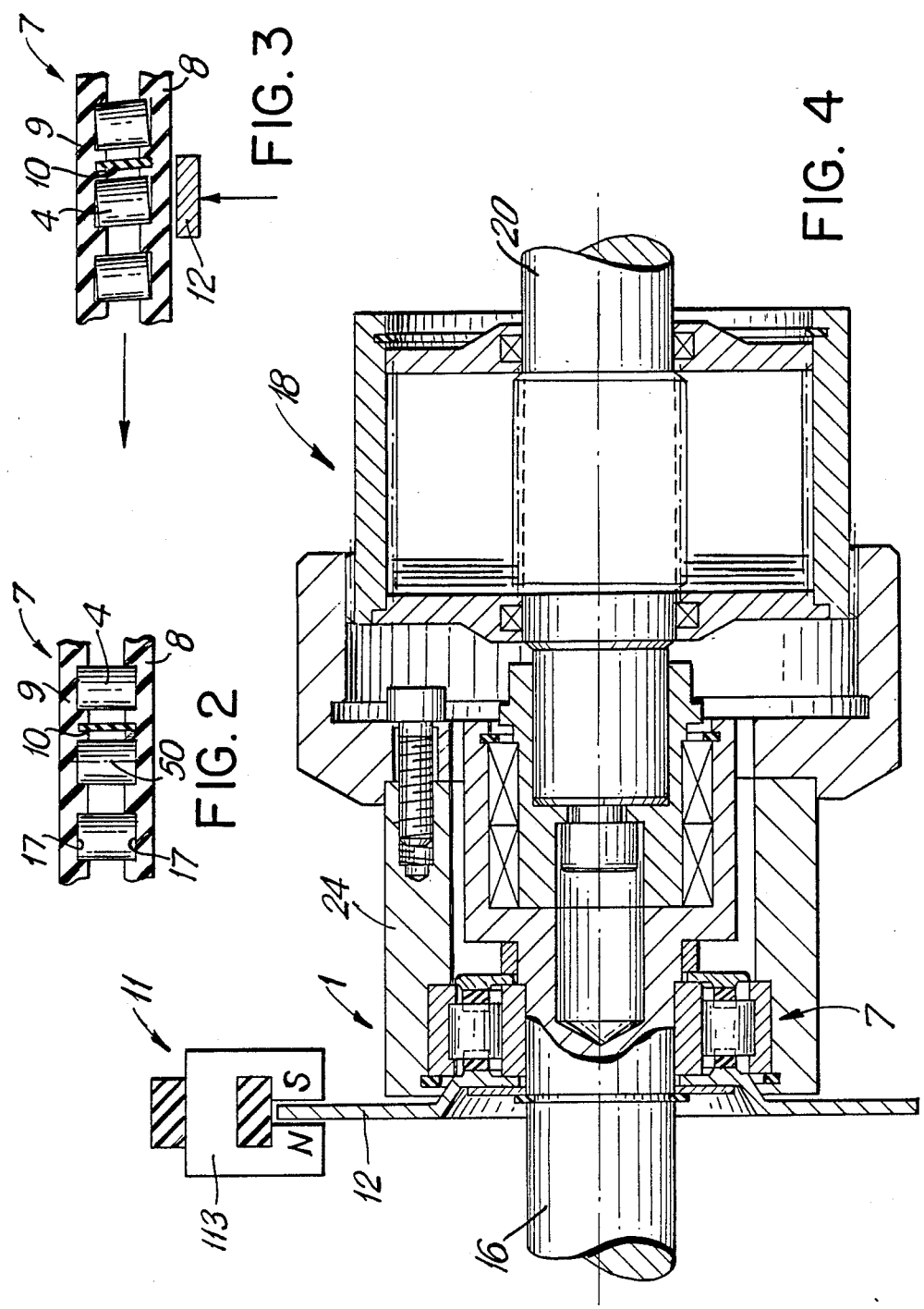

CLUTCH

BACKGROUND TO THE INVENTION

1. Field of the Invention

This invention relates to a clutch. More particularly the invention relates to a clutch having an inner part and an outer part which provide opposed races between which rollers (which may be in the form of needles) are received, means being provided to cause the rollers to jam on the races when torque is to be transmitted through the clutch.

2. Summary of the Invention

An object of the invention is to provide a simple clutch and one which may advantageously be combined with a viscous shear coupling for use in the driveline of a motor vehicle.

According to the invention we provide a clutch comprising concentric inner and outer parts rotatable about a common axis and having respectively outwardly and inwardly facing cylindrical races, a plurality of cylindrical rollers interposed between and engaging said races, a cage arranged to hold the rollers in circumferentially spaced relation, the cage comprising two separate parts, one part embracing the one ends of the rollers and the other part embracing the other ends of the rollers, resilient means for connecting said cage parts and biasing them to relative positions in which the longitudinal axes of the rollers are parallel to said common axis so that said rollers may roll around the races, and brake means associated with one of said parts and operable when the cage is rotating about said cage common axis to retard said one cage part relative to said other cage part so that the rotary axes of the rollers become inclined to said common axis and the rollers jam between the inner and outer races.

When the brake means is not operative, the rollers merely roll round the races and form, in effect, a roller bearing. In this state, the longitudinal axes of the rollers are parallel to the common axis of rotation between the parts of the clutch. When the brake is applied, the longitudinal axes of the rollers become inclined to the common axis and the rollers jam between the races, the rollers jamming at their centers on the inner race and at their ends on the outer race. In this position, torque can be transmitted between the two parts in either direction from the outer part to the inner part or the inner part to the outer part.

An advantage of the construction is that it is substantially wear-free. When the brake is not energized the rollers merely roll round the races and when the brake is energized there is no relative movement between the races and the rollers.

In a preferred arrangement, the brake means comprises a disc which is connected to one of said cage parts and which is subjected to a retarding force when the brake is operated thus to cause tilting of the roller axes. Preferably the braking means is a non-contact brake, i.e. one with no physical contact between the parts of the brake means. Thus in one embodiment the brake may be a hysteresis brake and include a magnet and means to move the magnet towards and away from the disc. The disc will be a material having a high magnetic hysteresis with a low coercive field strength and a comparatively high remanence and permeability. Full braking torque occurs at relatively low speeds and remains approximately constant with increase in speed.

The permanent magnet may be annular and mounted in a soft iron sleeve and arranged so that a shaft connected to the inner member passes rotatably through the central aperture of the magnet, the latter being non-rotatably mounted to be slidable relative to the shaft.

In another embodiment the brake is an eddy current brake and in this arrangement an electromagnet embraces the edge of the disc.

The resilient means between the cage parts may be in the form of leaf springs extending between the cage parts and circumferentially spaced around the cage.

The cage parts may be provided with recesses for receiving the ends of the rollers. Preferably the cage parts are made of a plastics material e.g. a polyamide.

The rollers may advantageously have a diameter to length ratio of between 1:1 and 1:20.

The invention also provides the combination of a clutch as described above with a viscous shear coupling comprising a housing, which is connected to the outer part of the clutch, and a hub rotatably mounted in the housing and connected to an output shaft, said coupling including a set of outer plates splined to the housing in spaced apart relation and a set of inner plates splined to the hub to be axially movable relative thereto, the plates of the two sets being interleaved and the housing being at least partially full of a viscous liquid, e.g. a silicone oil.

In this arrangement the hub may extend from the housing and may rotatably support, by means of a bearing, one end of a drive shaft which fixedly carries said inner part and said brake disc where provided, said outer part being connected to said housing by a hollow coupling which surrounds said bearing. The drive shaft may have a hollow end portion in which said bearing is received.

The invention also provides a drive transmission for a motor vehicle comprising a prime mover and a driveline between the prime mover and road wheels of the vehicle, the driveline including the combination of a clutch and a viscous shear coupling as described in which the inner part of the clutch is connected to the prime mover and the hub of the viscous shear coupling is connected to the road wheels. If the vehicle is a four-wheel drive vehicle the hub of the viscous coupling is connected to the set of wheels which is not permanently driven.

The combination of a clutch and a viscous shear coupling may also be combined with a differential gear and act across the differential gear to form a controllable, limited slip differential. The differential gear may be an inter-axle differential or an inter-wheel differential.

BRIEF DESCRIPTION OF THE DRAWINGS

The invention will now be described in detail by way of example with reference to the accompanying drawings in which:

FIG. 2 is a detail view of part of the cage of the clutch of FIG. 1 showing the rollers in non-torque transmitting positions;

FIG. 3 is a view similar to FIG. 2 but showing the rollers in torque transmitting positions;

FIG. 4 is a view similar to FIG. 1 but showing the different braking means for the clutch.

DESCRIPTION OF PREFERRED EMBODIMENTS

Figure 1:
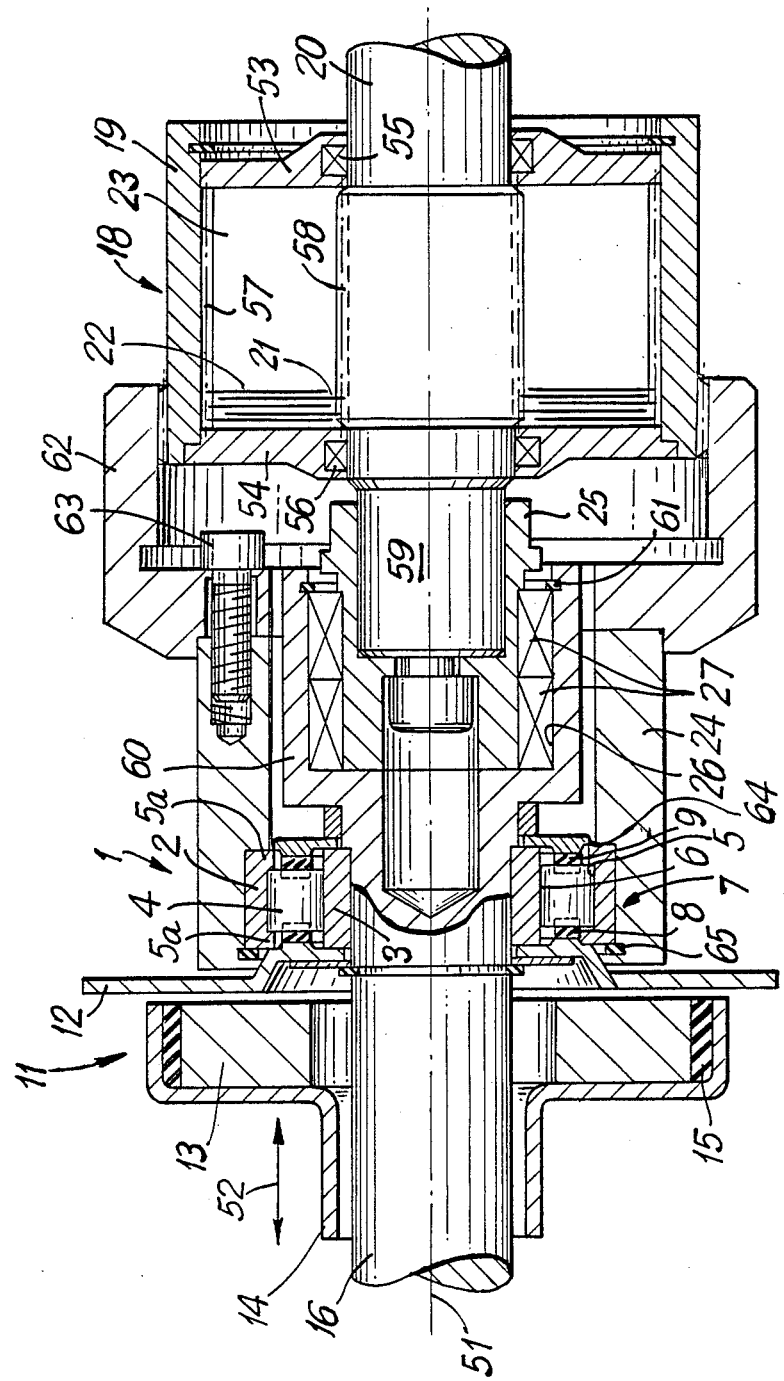
FIG. 1 is an axial section through a clutch constituting a first embodiment of the invention in combination with a viscous shear coupling.

Referring now to FIGS. 1 to 3, the clutch is indicated generally at 1 and includes an outer part 2 and an inner part 3. The outer part has an inwardly facing cylindrical race 5 and the inner part has an outwardly facing cylindrical race 6. Engaged with the races to roll thereon are cylindrical rollers 4. These rollers are mounted in circumferentially spaced relation in a cage 7 which will be described in detail below. The race 5 of the outer part is provided with sides 5a which laterally locate the rollers with some axial clearance. If desired the inner race 6 could have such lateral locating means instead of the outer race.

The cage 7 comprises two separate parts 8 and 9 as clearly shown in FIGS. 2 and 3. The parts are preferably made of a plastics material such as a polyamide. The parts are connected together by leaf springs 10 which are embedded at their ends in the parts 8 and 9. The parts have recesses 17 in their inwardly facing surfaces which receive and embrace the ends of the rollers 4 which engage the inner and outer races 5 and 6. Normally the leaf springs 10 hold the cage parts 8 and 9 in the relative positions shown in FIG. 2 and in this position the longitudinal axes 50 of the rollers are parallel to the common axis 51 about which the inner and outer parts 2 and 3 rotate.

Associated with the clutch is brake means 11. The brake means comprises a brake disc 12 which is fixedly connected to the cage part 8. The brake means 11 shown in FIG. 1 is a hysteresis brake and the disc 12 consists of a high magnetic hysteresis material such as a combination of copper and soft iron. The disc is associated with a permanent magnet 13 which is mounted in a soft iron sleeve 14 by means of a cast resin layer 15 which also fills the space within the sleeve between the poles of the magnet. The sleeve 14 is movable in the directions indicated by the arrow 52 by means not shown and is non-rotatably mounted about a drive shaft 16 which passes through the sleeve and through the magnet 13 which is annular. The brake is rendered effective by bringing the magnet 13 to the position shown in FIG. 1 and is rendered ineffective by moving the magnet to the left in that figure away from the brake disc 12.

The clutch is associated with a viscous shear coupling 18 which comprises a cylindrical housing 19 having end plates 53 and 54 carrying bearings and seals 55 and 56 respectively in which the hub 20 of a viscous shear coupling is carried. The housing 19 is internally splined at 57 and carries a set of outer plates 22, the adjacent plates being spaced apart by a fixed distance. The hub is externally splined at 58 and carries inner plates 21 which are free to slide on the splines. The coupling is shown with the plates 20 and 21 alternating but if desired one may have two plates 21 between each adjacent pair of plates 22. The housing is partially filled with a silicone oil.

The hub 20 of the viscous shear coupling extends to the left in FIG. 1 and has a spigot 59 on which is mounted a bearing sleeve 25. Roller bearings 27 are mounted on the bearing sleeve. The drive shaft 16 which carries the inner clutch part 3 is provided with an enlarged end portion 60 having a counter-bore 26 in which the roller bearings 27 are received. The roller bearings are held in position by a circlip 61.

The housing 19 of the viscous shear coupling is splined to a flanged sleeve 62 which is connected by bolts 63 to a further sleeve 24 in which the outer member of the clutch 2 is held between a shoulder 64 and a circlip 65.

It will be seen, therefore, that the direction of drive through the assembly shown in FIG. 1 is from the drive shaft 16, through the clutch 1 to the housing 19 of the viscous shear coupling and from thence to the output shaft 20.

In operation, when the brake 11 is inoperative with the magnet 13 arranged at a position remote from the disc 12, the rollers 4 take up the positions shown in FIG. 2 and when the shaft 16 rotates the inner member 3 the rollers will merely roll round the races without transmitting torque from the inner member 3 to the outer member 2.

If, however, the brake means 11 is now actuated by moving the magnet 13 to the position shown in FIG. 1 the part 8 of the cage will be retarded relative to the part 9 and the leaf springs 10 will be stressed. The rollers 4 will then take up the positions shown in FIG. 3 with their longitudinal axes 50 inclined to the common axis 51. As a result, the rollers jam between the outer and inner races 5 and 6 and transmit torque between the inner and outer members. The rollers jam at the centers of the rollers on the inner race 6 and at the ends of the rollers on the outer race 5. The spacing between the lateral locating sides 5a of the race 5 is sufficient to allow the rollers to take up their tilted or jamming positions shown in FIG. 3. When torque is transmitted through the clutch 1 then the housing 19 of the viscous shear coupling is driven and there is thus relative rotation between the housing 19 and the hub 20 and due to shearing of the silicone oil in the viscous shear coupling drive is transmitted to the hub or output shaft 20.

It will be noted that the braking device 11 is a non-contact brake. That is to say there is no physical contact between the magnet 13 and the disc 12 so that even if the brake is permanently actuated there would be no wear. Moreover frictional heat will not be generated in the brake which could cause a change in the conditions of operation of the brake.

FIG. 4 shows an arrangement which is basically similar to FIG. 1 and the same parts have the same reference numerals. In this case, however, instead of the brake disc 12 being operated upon by a permanent magnet 13 it is operated on by an electromagnet 113 which embraces the edge of the disc so that the braking means is an eddy current brake. As is well known, braking is effective by passing a current through the electromagnet and when there is no current there is no braking effect. The operation is otherwise similar to FIG. 1 in that drive is taken from the shaft 16 through the clutch 1 to the housing of the viscous shear coupling 18 and thus to the output shaft 20.

Figure 5:
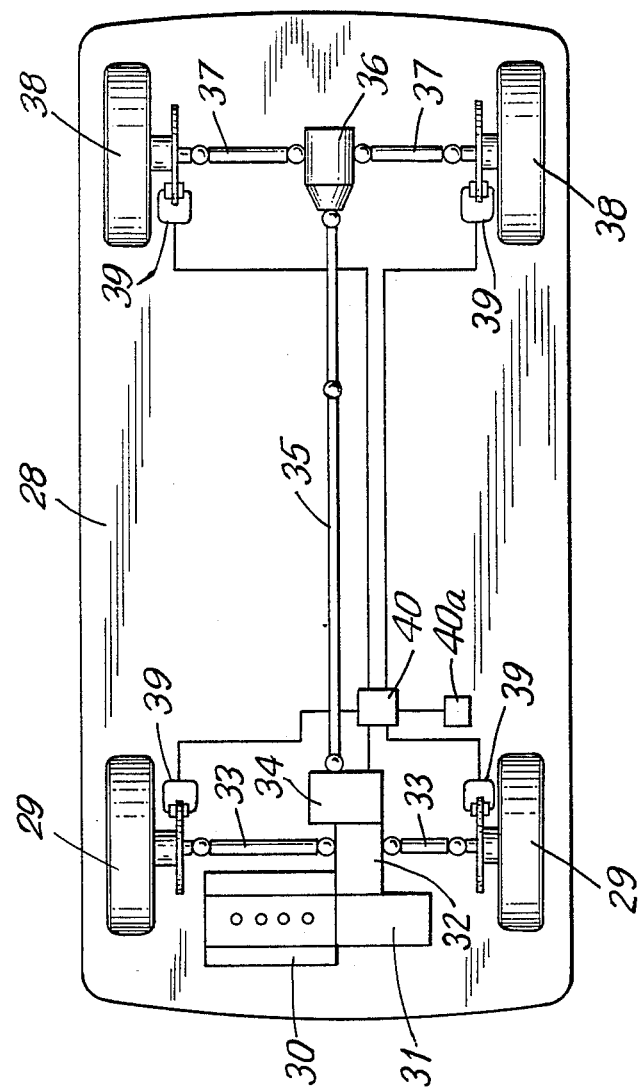
FIG. 5 shows how the combination of a clutch and viscous coupling embodying the invention may be applied to a four-wheel drive vehicle.

FIG. 5 shows a four-wheel drive vehicle in which the combination shown in FIGS. 1 and 4 may be used.

The vehicle comprises an engine 30 which drives the gearbox 31 and this in turn drives a front axle differential 32. The outputs from the front axle differential are taken through drive shafts 33 to front driving wheels 29.

The drive to the front wheel differential 32 also drives a device 34 which is in the form of one of the assemblies of FIGS. 1 and 4, the drive being taken to the shaft 16. The hub or output shaft 20 is connected to a propeller shaft 35 which in turn is connected to a rear axle differential 36. The outputs from the rear axle differential are taken by drive shafts 37 to rear wheels 38.

Front and rear wheel brakes 39 are shown which are connected to a control member 40 and the latter is connected to a further control member 40a. The control member 40 is connected to the brake means 11 and is operable to effect and release braking action.

There are various ways in which the arrangement shown in FIG. 5 can be operated. Thus in one arrangement, the control member 40 may be arranged to energise the braking means 11 to apply a retarding force to the cage part 8. When this occurs, if the front wheels 29 slip then torque is transmitted to the rear wheels. However, if the front brakes 39 are applied then a signal is taken to the control member 40 which disconnects the brake and thus prevents drive to the rear wheels during front wheel braking. This prevents instability of the vehicle. Moreover it is particularly useful where the vehicle is provided with an anti-lock braking system.

In another mode of operation, the brake is normally inactive so that there is no drive to the rear wheels 38 unless the driver specifically wants four-wheel drive in which case he operates the control member 40a which will, through the control member 40, energize the brake so that four-wheel drive is attained when there is slipping of the front wheels. However the control member 40 ensures that the brake 11 is de-energized when the front brakes 39 are operated thus to prevent vehicle instability.

In another arrangement, not illustrated, the combination of FIGS. 1 and 4 could be connected across two elements of a multi-element differential gear thus to provide a controllable, limited slip differential gear. The differential gear could be an inter-wheel differential gear or an inter-axle differential gear.

As has been mentioned above, although the viscous coupling 18 is shown with the plates 21 and 22 alternating and the plates 22 spaced apart, the plates 22 could be movable on the splines and the plates 21 could be arranged so that there are two plates 21 between each pair of adjacent plates 22.

It will be seen that the invention provides a simple and effective clutch and particularly when associated with a viscous shear coupling produces an assembly which is very useful in a four-wheel drive vehicle, especially one having anti-lock braking.

We claim:

1. A clutch comprising concentric inner and outer parts rotatable about a common axis and having respectively outwardly and inwardly facing cylindrical races, a plurality of cylindrical rollers interposed between and engaging said races, a cage arranged to hold the rollers in circumferentially spaced relation, the cage comprising two separate parts, one part embracing the one ends of the rollers and the other part embracing the other ends of the rollers, resilient means for connecting said cage parts and biasing them to relative positions in which the longitudinal axes of the rollers are parallel to said common axis so that said rollers may roll around the races, and brake means associated with one of said cage parts and operable when the cage is rotating about said common axis to retard said one cage part relative to said other cage part so that the rotary axes of the rollers become inclined to said common axis and the rollers jam between the inner and outer races.

2. A clutch according to claim 1 wherein said brake means comprises a disc connected to said one of said cage parts and which is subject to a retarding force when the brake is operated.

3. A clutch according to claim 1 wherein the brake means is a non-contact brake having a first element connected to said one of said cage parts, and a second element to retard said first element when said brake is operated, there being no physical contact between said elements of the brake means.

4. A driving assembly according to claim 3 wherein said brake is a hysteresis brake and includes a disc connected to said one of said cage parts and which is subject to a retarding force when the brake is operated.

5. A driving assembly according to claim 4 wherein said brake disc is of hysteresis material and the brake means further includes a magnet and means to move the magnet towards and away from the disc.

6. A driving assembly according to claim 5 wherein the magnet comprises an annular permanent magnet mounted in a soft iron sleeve and wherein a shaft connected to the inner member passes rotatably through the central aperture of the magnet, the latter being non-rotatably mounted to be slidable relative to the shaft.

7. A driving assembly according to claim 3 wherein the brake is an eddy current brake and said first element is a disc connected to one of said cage parts and which is subject to a retarding force when the brake is operated.

8. A driving assembly according to claim 7 wherein said second element of the brake means includes an electro-magnet embracing the edge of the disc.

9. A clutch according to claim 1 wherein said resilient means are in the form of a plurality of leaf springs extending between said cage parts and circumferentially spaced around the cage.

10. A clutch according to claim 1 wherein each of said cage parts is provided with recesses for receiving the ends of the rollers.

11. A clutch according to claim 1 wherein the cage parts are made of plastics material.

12. The combination of (1) a clutch comprising concentric inner and outer parts rotatable about a common axis and having respectively outwardly and inwardly facing cylindrical races, a plurality of cylindrical rollers interposed between and engaging said races, a cage arranged to hold the rollers in circumferentially spaced relation, the cage comprising two separate parts, one part embracing the one ends of the rollers and the other part embracing the other ends of the rollers, resilient means for connecting said cage parts and biasing them to relative positions in which the longitudinal axes of the rollers are parallel to said common axis so that said rollers may roll around the races, and brake means associated with one of said cage parts and operable when the cage is rotating about said common axis to retard said one cage part relative to said other cage part so that the rotary axes of the rollers become inclined to said common axis and the rollers jam between the inner and outer races; and (2) a viscous shear coupling comprising a housing, which is connected to the outer part of the clutch, and a hub rotatably mounted in the housing and connected to an output shaft, said coupling including a set of outer plates splined to the housing in spaced-apart relation and a set of inner plates splined to the hub to be axially movable relative thereto, the plates of the two sets being interleaved and the housing being at least partly filled with a viscous liquid.

13. The combination according to claim 12 wherein the hub extends from the housing and rotatably supports, by means of a bearing, one end of a drive shaft which fixedly carries said inner part and said brake disc where provided, said outer part being connected to said housing by a hollow coupling which surrounds said bearing.

14. The combination according to claim 12 wherein the drive shaft has a hollow end portion in which said bearing is received.

15. A drive transmission for a motor vehicle comprising a prime mover and a driveline between the prime mover and road wheels of the vehicle, the driveline including (1) a clutch comprising concentric inner and outer parts rotatable about a common axis and having respectively outwardly and inwardly facing cylindrical races, the inner part of the clutch being connected to the prime mover, a plurality of cylindrical rollers interposed between and engaging said races, a cage arranged to hold the rollers in circumferentially spaced relation, the cage comprising two separate parts, one part embracing the one ends of the rollers and the other part embracing the other ends of the rollers, resilient means for connecting said cage parts and biasing them to relative positions in which the longitudinal axes of the rollers are parallel to said common axis so that said rollers may roll around the races, and brake means associated with one of said cage parts and operable when the cage is rotating about said common axis to retard said one cage part relative to said other cage part so that the rotary axes of the rollers become inclined to said common axis and the rollers jam between the inner and outer races; and (2) a viscous shear coupling comprising a housing, which is connected to the outer part of the clutch, and a hub rotatably mounted in the housing and connected to the road wheels, said coupling including a set of outer plates splined to the housing in spaced-apart relation and a set of inner plates splined to the hub to be axially movable relative thereto, the plates of the two sets being interleaved and the housing being at least partly filled with a viscous liquid.

16. A drive transmission according to claim 15 including front road wheels which are directly driven from the prime mover and rear road wheels which are connected to the hub of the viscous shear coupling.

17. The combination of (1) a multi-element differential gear; (2) a clutch comprising concentric inner and outer parts rotatable about a common axis and having respectively outwardly and inwardly facing cylindrical races, the inner part of the clutch being connected to one element of said gear; a plurality of cylindrical rollers interposed between and engaging said races, a cage arranged to hold the rollers in circumferentially spaced relation, the cage comprising two separate parts, one part embracing the one ends of the rollers and the other part embracing the other ends of the rollers, resilient means for connecting said cage parts and biasing them to relative positions in which the longitudinal axes of the rollers are parallel to said common axis so that said rollers may roll around the races, and brake means associated with one of said cage parts and operable when the cage is rotating about said common axis to retard said one cage part relative to said other cage part so that the rotary axes of the rollers become inclined to said common axis and the rollers jam between the inner and outer races; and (2) a viscous shear coupling comprising a housing, which is connected to the outer part of the clutch, and a hub rotatably mounted in the housing and connected to another element of said gears, said coupling including a set of outer plates splined to the housing in spaced-apart relation and a set of inner plates splined to the hub to be axially movable relative thereto, the plates of the two sets being interleaved and the housing being at least partly filled with a viscous liquid.

18. A combination according to claim 17 wherein said differential gear is an inter-wheel differential gear.

19. A combination according to claim 17 wherein said differential gear is an inter-axle differential gear.

* * * * *